Nov. 8, 1955     A. R. OBERWEGNER     2,723,132
AUXILIARY OPERATING MECHANISM FOR BICYCLES
Filed Dec. 20 1951
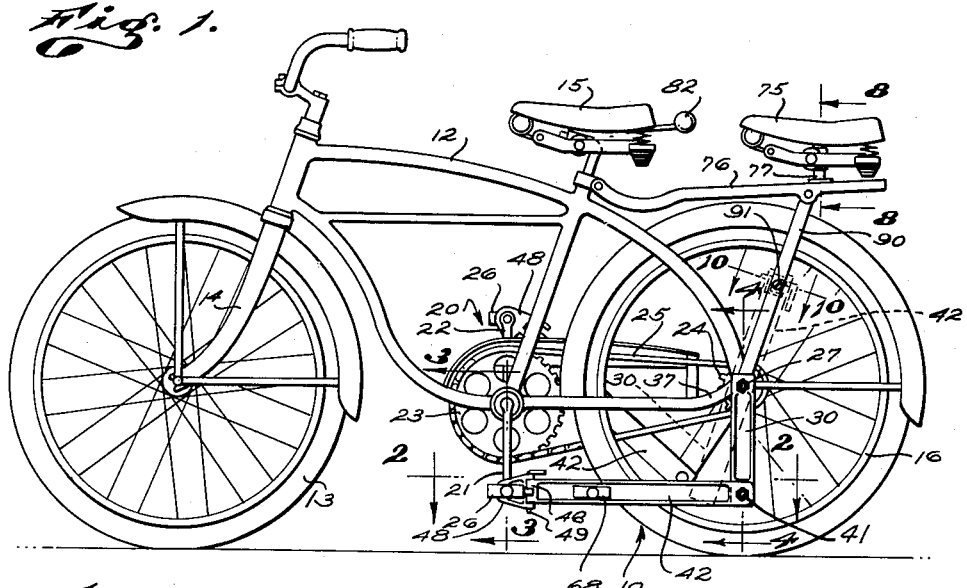
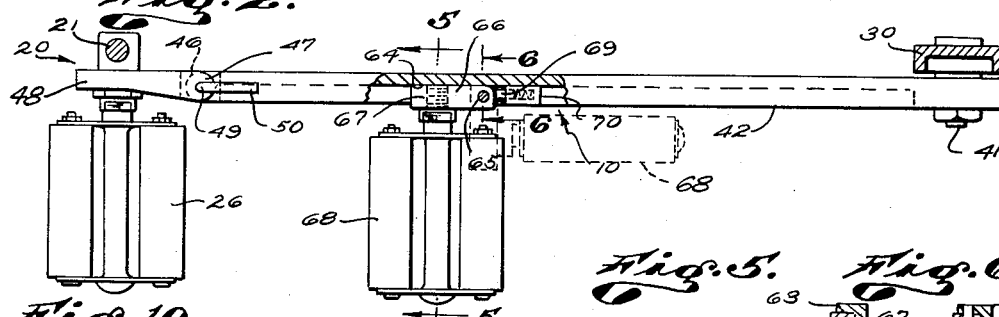
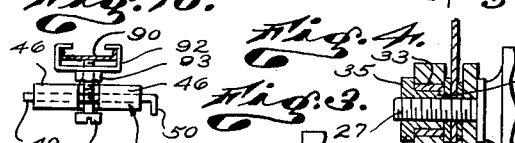
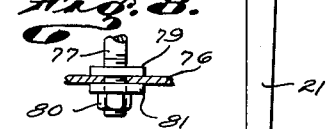
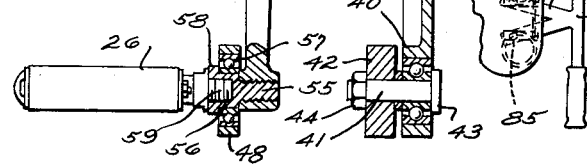
INVENTOR:
Alfred R. Oberwegner
BY
Walter J. Stevenson
AGENT

United States Patent Office 2,723,132
Patented Nov. 8, 1955

2,723,132
AUXILIARY OPERATING MECHANISM FOR BICYCLES

Alfred R. Oberwegner, Los Angeles, Calif.

Application December 20, 1951, Serial No. 262,520

5 Claims. (Cl. 280—231)

My invention relates generally to vehicles, and more particularly to a bicycle and driving means for rotating the driving wheel thereof. Specifically, the invention pertains to a compound crank motion or operating means by which torque is applied to the driving wheel, the present concept being concerned with an auxiliary operating means actuated by a second rider on the bicycle for increasing the torque developed by the conventional crank motion.

Tandem bicycles have been used quite extensively in the past for conveying two passengers, such bicycles having a pair of cranks each operated by a rider, the combined efforts of the two riders producing the energy required to propel the bicycles along the road. While such tandem bicycles are quite popular at resorts or vacation areas, they have several disadvantages which practically prohibit their use in congested areas. One of these disadvantages is that such a cycle is long, heavy, and cumbersome. In addition, such a vehicle is not easily maneuvered on the road and is wholly unsuitable for use by a single rider since the energy exerted by one rider is hardly sufficient to propel the heavy bicycle.

It is quite common practice for the rider of a conventional bicycle to take along a passenger who usually sits on the luggage carrier disposed at the rear of the rider's seat. Such a passenger obtains a "free ride" since he does not contribute energy for propelling the bicycle. Thus, the driver must exert energy far in excess of that normally required to propel the bicycle when he alone is riding the same.

It is an object of my invention to provide a bicycle of conventional size having a compound crank motion for rotating the rear driving wheel, said crank motion being operable by either one or two riders, so that when a second person is being transported he may help to operate the crank motion and thus apply the additional torque to the driving wheel necessary to compensate for his weight.

Another object is to provide in a bicycle having a conventional rider-operated pedal crank, an auxiliary operating means which is so connected to said crank that power exerted by the second rider upon this operating means is transmitted to the conventional crank and thence to the driving wheel through the medium of a chain and sprockets, or other power transmission means.

Another object is to provide an auxiliary operating means which preferably is in the form of an attachment which may be readily applied to and removed from a conventional bicycle so as to convert the bicycle from a one-passenger vehicle to a two-passenger or tandem type bicycle, or vice versa, as desired. A related object is to provide such an attachment which may be applied to any conventional bicycle without altering the structure thereof and by the use of a single wrench.

Another object is to provide an auxiliary operating means which includes a lever-arm having one end pivotally connected to the axle of the driving wheel, a link having one end pivotally connected to the free end of the lever arm, and its other end pivotally connected to the free end of the conventional crank arm of the bicycle, preferably at the axis of rotation of the pedal mounted thereon, and a pedal rotatably connected to the link intermediate its ends. In accordance with the invention, the auxiliary operating means is provided in duplicate, one arranged at each side of the bicycle and connected to one of the crank arms of the bicycle.

A further object is to provide an auxiliary operating means which includes wear-resistant bearings at the pivotal connections so as to reduce the force necessary to operate the means and to minimize wear between the components.

A further object is to provide an auxiliary operating means, of the character referred to, in which the link is preferably articulated, the two parts of the link being joined by a connecting pin so that by simply removing the pin, the auxiliary operating means is rendered inoperative.

A further object of the invention is to provide a tandem attachment for conventional bicycles which includes, in addition to the auxiliary operating means referred to above, a secondary or additional support for the second rider on the cycle. In accordance with the present concept, I provide a support which is readily attached to the conventional luggage carrier overlying the driving wheel and which includes a second seat. The support includes a post which projects upwardly from a plate-like clamping means, the saddle being adjustably secured to this post.

Another object is to provide an auxiliary operating means of the character referred to in which each auxiliary pedal carried by a holder member is pivotally mounted thereon to adapt the pedal to be pivoted to an operative position in which it projects laterally outwardly from the link, and to a retracted inoperative position wherein it extends alongside the link. By this provision, the auxiliary pedals may be retracted when the auxiliary operating means is not in use. A related object is to provide detent means on the link operative to retain the holder member in either its extended or retracted positions.

A further object is to provide an auxiliary operating means in which the lever arms and links are constructed from channel stock so as to render them light in weight without sacrificing strength.

A still further object is to provide a retaining means on the frame of the bicycle for holding the auxiliary operating means in folded inoperative position against the frame after the links have been disconnected from the main cranks of the bicycle.

Further objects will appear from the following description, and from the drawing, which is intended for the purpose of illustration only and in which:

Fig. 1 is a side view of a conventional bicycle, showing my tandem or auxiliary operating means applied thereto;

Fig. 2 is an enlarged sectional plan view of the operating link of the auxiliary drive, taken on line 2—2 of Fig. 1;

Fig. 3 is a vertical sectional view, taken on line 3—3 of Fig. 1, showing the pivotal connection for the operating link at the main crank of the bicycle;

Fig. 4 is a vertical sectional view, taken on line 4—4 of Fig. 1;

Fig. 5 is a cross-sectional view, taken on line 5—5 of Fig. 2;

Fig. 6 is a similar view, taken on line 6—6 of Fig. 2;

Fig. 7 is a fragmentary view of a portion of the operating link, showing graphically the path of movement of the auxiliary pedal carried by the link;

Fig. 8 is a vertical sectional view of the auxiliary seat connection, taken on line 8—8 of Fig. 1;

Fig. 9 is a plan view of the hand-grip means employed by the rear rider, and

Fig. 10 is a cross-sectional view, taken on line 10—10 of Fig. 1.

Referring to the drawing in detail, my auxiliary operating means 10 is shown as applied to use in connection with a conventional bicycle which has a frame 12, a front steerable wheel 13 carried by the usual fork 14, a seat 15 for supporting a rider, and a rear driving wheel 16. The wheel 16 is rotated to propel the bicycle along a roadway by means of a conventional crank 20 which is rotatable in a crank bearing forming part of the frame 12. The crank 20 has oppositely extending crank arms 21 and 22 and a sprocket 23 which drives a smaller sprocket 24 on the axle, or coaster brake, of the wheel 16 through the medium of a chain 25, the crank arms carrying pedals 26 by which the crank can be manually rotated in the usual manner.

Pivoted on the opposite ends of the axle 27 of the rear wheel 16 are lever-arms 30, one at each side of the bicycle. Each lever-arm may be made from channel stock to render it light in weight, yet strong and durable in use. Each lever-arm is pivoted to the axle in the manner illustrated in Fig. 4, to which view reference is now made. At its upper end, the lever-arm 30 is provided with a boss 32 having a hole into which a sleeve 33 is forced. A journal element 35 is screwed onto the outer threaded end of the axle or spindle 27 and has an inner, sleeve-like shank 36 which is set up against the rear fork portion 37 of the bicycle frame 12. The shank 36 extends through the sleeve 33 to provide a support for the lever-arm 30 which pivots thereon. The element 35 has a head 38 which acts to retain the lever-arm in place. The element 35 thus is substituted for the usual spindle nut which ordinarily is screwed onto the spindle or axle to retain the axle assembly in adjusted position on the rear fork of the bicycle frame, the element additionally providing a journal for the lever-arm. Since the axle spindles of American and English made bicycles have different screw threads, elements 35 having the appropriate threads are provided.

At its lower end, the lever-arm 30 has a boss 40 provided with a bearing through which extends the shank of a bolt 41. Pivoted on the bolt 41 is the rearward end of an operating link 42. A head 43 of the pivot bolt 41 abuts one side of the arm 30 and a nut 44 is screwed onto the other end of the bolt.

The forward end of the channel-shaped operating link 42 is provided with a boss which is slotted to provide transversely-spaced hinge ears 46 which interleave with similar hinge ears 47 provided at the rearward end of a pivot element 48 (Figs. 1 and 2). The pivot element 48 and the operating link 42 are detachably connected by means of a hinge-pin 49 which extends through aligned holes in the ears 46 and 47, this pin having a bent end 50 providing a handle by which the pin can be readily withdrawn from the ears to permit disconnection of the parts 42 and 48 for the purpose to be later explained.

The forward end of the pivot element 48 is pivotally connected to the outer free end of the crank arm 21, at the outer side thereof, as shown best in Fig. 3. Referring to this view in detail, a stud 55 has an end which is screwed into the usual threaded hole adjacent the end of the crank arm 21, this hole usually receiving the screw-threaded end of the spindle of a conventional pedal. The stud 55 has an enlarged portion 56 which serves as a bearing or pivot pin for receiving the inner race of a ball bearing 57, the outer race of which has a force fit in a transverse hole in the forward end of the pivot element 48. Thus, the pivot element 48 is pivotally connected to the free end of the crank arm 21. The stud 55 has a head 58 at its outer end which serves to retain the pivot element 48 in place. Into a threaded hole in the outer end of the stud 55 is screwed the threaded end of the spindle 59 of a conventional pedal 26. By this arrangement of parts, the pivot element 48, forming the forward end of the operating link 42, is interposed between the crank-arm 21 and the pedal 26 for pivotal movement on the axis of rotation of the pedal.

The operating link 42 has longitudinal webs 63 which define a recess 64 in the outer side of the link (Figs. 2 and 5). A vertical cross-pin 65 (Fig. 6) extends transversely across the recess between the webs, and pivoted on this pin is one end of a holder 66 in the form of a rectangular plate. Adjacent its free end, the holder 66 has a threaded hole into which is screwed the threaded end of the spindle 67 of an auxiliary pedal 68, of conventional form. During operation of the auxiliary operating means, the holder 66 assumes the position shown by full lines in Fig. 2 where it is disposed within the recess 64, at which time the pedal 68 projects laterally outwardly to its operating position. When the auxiliary operating means is not in use, the holder 66 is pivoted through ninety degrees to the broken line position indicated in Fig. 2 and the pedal is caused to assume a position adjacent the outer side of the operating link 42. A spring-actuated plunger 69, slidable in a block 70, engages the holder 66 to frictionally retain the latter in either of its two positions.

Referring to Fig. 1 of the drawing, it will be observed that an auxiliary operating means, such as described above, is provided at each side of the bicycle. This dual operating means is adapted to be manipulated by a rider who is seated on the bicycle over the rear wheel 16 thereof. In order to support the rider comfortably, I provide a rear seat 75 which, as shown, is mounted on the usual luggage carrier 76 of the bicycle. Referring to Fig. 8, the lower threaded end of a post 77 extends downwardly through an opening in the luggage carrier 76. A first clamping plate 79, screwed onto the post 77, rests against the top surface of the luggage carrier, and a nut 80 screwed onto the lower end of the post and against a second clamping plate 81 draws the plates toward each other to grip the luggage carrier therebetween, thus retaining the post in place. The rear seat 75 is clamped to the upper end of the post 77 by any suitable means, the post being initially adjusted vertically by screwing it upwardly or downwardly in the plate 79, after which the nut is tightened.

The rider supported by the rear seat 75 actuates the auxiliary operating mechanism by manipulating the auxiliary pedals 68, and to steady this rider, during propelling of the vehicle, I provide a hand-hold 82 which is, in effect, an auxiliary handle-bar. The hand-hold 82 is in the form of a rod or tube extending transversely of the bicycle at the rear of the main seat 15 and provided with hand grips at its ends. Referring to Fig. 9, the hand-hold 82 has a pair of mounting strips 84 which extend forwardly under the seat 15 where they are held by means of the usual screws 85 which fasten the cushion-like saddle to the frame of the seat.

Assuming that the bicycle is to transport two persons, one rider assumes a position upon the forward seat 15 with his legs straddling the bicycle frame and with his feet resting upon the opposite pedals 26, this rider grasping the main handle-bar to steer the bicycle. The other rider mounts the bicycle by sitting on the rear seat 75 with his legs straddling the rear wheel 16 and with his feet engaging the auxiliary pedals 68, which at this time assume the operative position shown by full lines in Fig. 2. To propel the bicycle, the forward rider operates the crank 20 in the usual manner to apply torque to the rear axle through the medium of the sprockets 23 and 24 and the driving chain 25. At the same time, the rear rider contributes to the torque applied to the rear wheel by alternately pressing downwardly on the opposite auxiliary pedals 68. That is to say, as each crank arm 21 and 22 rotates to carry its pedal 26 forwardly across top center, the auxiliary pedal 68, which is operatively connected to the particular crank arm, is forced downwardly by the rear rider.

This downward force is transmitted through the operating links 42 to the crank arms to increase the torque applied to the crank 20 and thus to the driving wheel 16. The second or rear rider of this tandem bicycle thus contributes his share of the power required to propel the bicycle and the energy usually exerted by the front rider, when he alone propels the bicycle carrying two passengers, is materially reduced, that is, to approximately one-half the usual energy. The path of movement of each of the auxiliary pedals 68 is indicated by the generally elliptical curve in Fig. 7. By consulting this curve, it is seen that the rear rider exerts both forward and downward forces alternately against each auxiliary pedal during the operative stroke of the corresponding crank arm 21 or 22. During travel of the bicycle in this manner, the rear passenger remains comfortably seated on the rear saddle 75 and maintains his equilibrium by grasping the auxiliary handle-bar 82.

When the bicycle is to be used conventionally, that is, to transport only one person, the auxiliary pedals 68 may be folded to their inoperative positions, as indicated by the broken lines in Fig. 2, if desired. If the bicycle normally is used to convey one person and only occasionally to transport two persons, the auxiliary operating means may normally be disconnected. This is readily accomplished by simply removing the hinge-pins 49 to disconnect the forward ends of the operating links 42 from their respective pivot elements 48. With the links 42 thus disconnected, they are swung upwardly on their pivots 41 to position their upper ends against the brackets 90 which support the luggage carrier 76, see broken lines in Fig. 1.

Headed screws 91 are carried by substantially U-shaped members 92, the latter being adjustable vertically along the brackets 90 and retained in position by the screws which are screwed through nuts 93, welded to the members, and against the brackets 90, as shown in Fig. 10. The headed screw 91 on each member 92 is adapted to be disposed between the ears 46 of one of the operating links 42. After each link has thus been positioned, the pin 49 is inserted through the holes in the ears 46 to extend across the screw 91 and to engage the inner side of the head thereof so as to lock the auxiliary operating parts in their inoperative position. When the bicycle is to transport two passengers, the pin 49 is withdrawn to allow the link 42 to be swung downwardly for connection to its pivot element 48. It is thus seen that the vehicle can be quickly converted from a single passenger bicycle to one of the tandem type, and vice versa, as desired.

When the operating links 42 are disconnected, the pivot elements 48 remain connected to the crank arms 21 and 22 and merely hang pendulously from the studs 55, inwardly of the main pedals 26 so as not to interfere with the operation thereof. Besides providing a convenient means for detachably connecting the links 42 to the crank arms 21 and 22, the pivot elements 48, due to their hinge connection 49 to the links, allow actuation of the auxiliary operating means, even when the rear axle 27 is out of parallelism with the axis of rotation of the crank 20. This is an important consideration since, by this articulated link structure, undue friction or binding action, which might impair free movement of the mechanism and cause wear of its components, is avoided.

In accordance with the provisions of the patent statutes, I have described the principle of operation of my invention, together with the mechanism which I now consider to represent the best embodiment thereof.

I claim as my invention:

1. An auxiliary operating means for use in connection with a bicycle having a frame, a driving wheel, a crank arm rotatable on the frame and having a pedal rotatable at its outer end, sprockets connected with said crank arm and said wheel, and a chain extending around said sprockets, comprising: a lever arm pivoted on the axis of the wheel and having a free end; a pivot element pivotally mounted on said crank arm at the axis of rotation of its pedal and having an end projecting from said axis, said end having spaced, perforated hinge ears; a link having one end pivotally connected to said free end of said lever arm and its other end provided with spaced perforated hinge ears interleaving with the hinge ears of said pivot element; and a hinge pin extending through all of said hinge ears, normal to the axis of rotation of said crank arm, said hinge pin having a relatively tight fit in said ears and being provided with a bent end providing a handle by which the pin can be manually withdrawn from said ears to permit disconnection of said link and said pivot element.

2. An auxiliary operating means for use in connection with a bicycle having a frame, a driving wheel, a crank arm rotatable on the frame and having a pedal rotatable at its outer end, sprockets connected with said crank arm and said wheel, and a chain extending around said sprockets, comprising: a lever arm pivoted on the axis of the wheel and having a free end; a stud carried by said crank arm and extending parallel to the axis of the same, said pedal being carried by said stud and coaxial therewith; a pivot element pivotally mounted on said stud on the axis of rotation of said pedal and having an end projecting radially from said axis, said end having spaced, perforated hinge ears; a link having one end pivotally connected to said free end of said lever arm and its other end provided with spaced perforated hinge ears interleaving with the hinge ears of said pivot element; and a hinge pin extending through all of said hinge ears, normal to the axis of rotation of said crank arm, said stud having a head abutting a side of the pivot element and retaining the same axially in place.

3. An auxiliary operating means for use in connection with a bicycle having a frame, a driving wheel, a crank arm rotatable on the frame and having a pedal rotatable at its outer end, sprockets connected with said crank arm and said wheel, and a chain extending around said sprockets, comprising: a lever arm pivoted on the axis of rotation of the wheel and having a free end; a pivot element pivotally mounted on said crank arm at the axis of rotation of its pedal and having an end projecting from said axis; a link having one end pivotally connected to said free end of said lever arm and its other end pivotally connected to said end of said pivot element on an axis normal to the axis of said pedal; and a pedal rotatable on said link, intermediate its ends and on the longitudinal axis thereof, by which force can be exerted upon said link tending to increase the torque applied to the wheel by said crank arm, sprockets and chain, said operating means also including a stud having an externally threaded inner end screwed into a threaded hole in the end of said crank arm, said stud having a shank portion on which said pivot element is rotatable, and on outer internally threaded end, said first mentioned pedal having a screw-threaded spindle screwed into said outer end of said stud.

4. An auxiliary operating means for use in connection with a bicycle having a frame, a driving wheel, a crank arm rotatable on the frame and having a pedal rotatable at its outer end, sprockets connected with said crank arm and said wheel, and a chain extending around said sprockets, comprising: a lever arm pivoted on the axis of rotation of the wheel and having a free end; a pivot element pivotally mounted on said crank arm at the axis of rotation of its pedal and having an end projecting from said axis; a link having one end pivotally connected to said free end of said lever arm and its other end pivotally connected to said end of said pivot element on an axis normal to the axis of said pedal; and a pedal rotatable on said link, intermediate its ends and on the longitudinal axis thereof, by which force can be exerted upon said link tending to increase the torque applied to the wheel by said crank arm, sprockets and chain, said pivot element carrying a ball bearing; and a stud having an externally threaded inner end screwed into a threaded hole in the end of said crank arm, said stud having a shank portion receiving said ball bearing so as to pivotally support said pivot element, and an outer internally threaded end, said first mentioned pedal having a screw-threaded spindle screwed into said outer end of the stud, said stud having a flange abutting said pivot element to retain the same axially in place.

5. An auxiliary operating means for use in connection with a bicycle having a frame, a driving wheel, a crank arm rotatable on the frame and having a pedal rotatable at its outer end, sprockets connected with said crank arm and said wheel, and a chain extending around said sprockets, comprising: a lever arm pivoted on the axis of the wheel and having a free end; a pivot element pivotally mounted on said crank arm at the axis of rotation of its pedal and having an end projecting from said axis, said end having spaced, perforated hinge ears; a link having one end pivotally connected to said free end of said lever arm and its other end provided with spaced perforated hinge ears interleaving with the hinge ears of said pivot element; a hinge pin extending through all of said hinge ears, normal to the axis of rotation of said crank arm, said hinge pin having a relatively tight fit in said ears and being provided with a bent end providing a handle by which the pin can be manually withdrawn from said ears to permit disconnection of said link and said pivot element, said operating means also including retaining means on the frame engageable with the hinge ear end of said link when the link is disconnected from said pivot element and pivoted upwardly, so as to retain the link in an inoperative position.

References Cited in the file of this patent

UNITED STATES PATENTS

| | | |
|---|---|---|
| 568,862 | Miehle | Oct. 6, 1896 |
| 602,162 | Kellogg | Apr. 12, 1898 |
| 788,794 | Evans | May 2, 1905 |
| 913,446 | Adams | Feb. 23, 1909 |
| 1,045,220 | Turner | Nov. 26, 1912 |
| 1,091,405 | Trambley | Mar. 24, 1914 |
| 2,619,364 | Carson | Nov. 25, 1952 |

FOREIGN PATENTS

| | | |
|---|---|---|
| 52,401 | Germany | Dec. 3, 1889 |
| 16,510 | Great Britain | of 1888 |
| 24,469 | Great Britain | of 1895 |
| 378,397 | Italy | Feb. 7, 1940 |
| 411,892 | Italy | July 19, 1945 |